United States Patent

[11] 3,567,128

[72] Inventors George R. Urquhart;
Dale W. R. Lawson, Bonita; Jack H. Hilbig, Chula Vista, Calif.
[21] Appl. No. 838,541
[22] Filed July 2, 1969
[45] Patented Mar. 2, 1971
[73] Assignee Rohr Corporation
Chula Vista, Calif.

[54] THRUST REVERSING APPARATUS
20 Claims, 7 Drawing Figs.
[52] U.S. Cl. ................................................239/265.29,
239/265.37, 60/232, 181/33.222
[51] Int. Cl. ....................................................... B64c 15/06
[50] Field of Search........................................239/265.27,
265.29, 265.37; 60/228, 229, 232; 181/33.222

[56] References Cited
UNITED STATES PATENTS
2,976,681 3/1961 Bennett et al................. 239/265.29
2,979,893 4/1961 Meyer......................... 239/265.29

Primary Examiner—M. Henson Wood, Jr.
Assistant Examiner—Michael Y. Mar
Attorney—George E. Pearson ABSTRACT: Apparatus includes shroud positioned at rear of jet nozzle to surround and control gas stream. Shroud includes fixed portions defining lateral passages between them and pivoted doors stowed to close passages and complete shroud. When doors deploy, their trailing edges meet within shroud contour to block and deflect gas laterally. Perpendicular retractable end plates at leading edges divert gas forwardly to create reverse thrust. Back pressure from reverser tends to cause back flow into ejector barrel surrounding nozzle in area upstream of fixed portions. Retractable fences are mounted on fixed portion inner faces to intercept and redirect back flow while allowing air flow through ejector barrel in region of fixed portions. Doors are controlled to any degree of deployment for fully modulated thrust control in flight, particularly useful for tactical military aircraft.

PATENTED MAR 2 1971

INVENTOR.
GEORGE R. URQUHART
DALE W.R. LAWSON
JACK H. HILBIG

BY Edwin D. Grant
ATTORNEY

INVENTOR.
GEORGE R. URQUHART
DALE W.R. LAWSON
JACK H. HILBIG
BY Edwin D. Grant
ATTORNEY INVENTOR.
GEORGE R. URQUHART
DALE W.R. LAWSON
JACK H. HILBIG
BY Edwin D. Grant
ATTORNEY

THRUST REVERSING APPARATUS

BACKGROUND OF THE INVENTION

This invention lies in the field of gas turbine engines, more commonly called jet engines, which produce reaction thrust by ejecting a high velocity stream of gas from the exhaust nozzle of the gas turbine. Airplanes driven by jet engines fly and land at much higher speeds than propeller driven aircraft. Their high landing speed puts a great burden on the wheel brakes and of course they do not have propellers which are readily reversible to produce reverse thrust. Therefore it is necessary to provide apparatus to reverse the gas stream to accomplish this result.

It is also highly desirable to be able to control effective thrust in flight. This is particularly so in the case of tactical military airplanes, which may be required to decelerate rapidly in combat maneuvers or limit their speed in steep dives in bombing operations. Conventionally, speed brakes are used for this purpose.

Various types of thrust reversers have been in use for many years, primarily to reduce landing run although some have been successfully used in flight to reduce forward speed more rapidly than by throttling the engine. All of them utilize a basic principle of blocking the rearward flow of the exhaust gas stream and diverting it laterally and substantially forwardly to produce reverse thrust. One common type uses a pair of deflectors which meet externally behind the nozzle to divert the stream laterally in opposite directions, usually with a forward component. Another similar type has doors mounted within the nozzle to block flow, lateral openings in the nozzle, and doors or deflectors which normally cover these openings, but which may be swung outward to uncover the openings and direct the diverted streams laterally and forwardly. In another type, doors within the nozzle may be moved to block flow, and cascade passages are uncovered in the sidewalls to allow the gas to issue laterally and forwardly.

All of these systems work reasonably well but they have various drawbacks. They are difficult to modulate and normally are used only in fully deployed position. The external target type, with deflectors behind the nozzle, requires considerable supporting structure and usually has larger deflectors than is desirable. Also, it is difficult to arrange a pivotal mounting which will make them "fail-safe"; i.e., mounted so that in the event the actuating mechanism fails they will be urged by the gas stream toward stowed position. The other types have rather complicated mechanism, at least part of which is always subjected to the hot gas stream and thus is a possible source of trouble or failure. Generally, their efficiency or percentage of forward thrust available in reverse thrust is below 50 percent.

SUMMARY OF THE INVENTION

The present invention provides superior performance and is adaptable to all types of engines. The deflectors or doors are smaller than those of some previous systems while producing a higher thrust reversal factor, and there are a relatively small number of parts which are rugged and dependable. Generally stated, in its generic form, the apparatus includes a shroud which is mounted behind the nozzle exit to surround and control the gas stream. The shroud has one or more fixed portions defining lateral openings for the diverted gas stream and a door for each opening.

The doors are pivotally mounted on the fixed portions which are rearwardly extending support structures, the pivotal connections being intermediate the fore-and-aft length of the doors and openings. In stowed position, each door mates with its respective opening to define the shroud as an elongate conduit which is substantially axially aligned with the axis of the nozzle. When the doors are fully deployed, their trailing edges swing in to meet at the axis of the nozzle within the shroud contour and substantially block the path of the gas stream. At the same time the leading edges swing laterally outward beyond the shroud contour. Preferably the doors in this position form a V which is slightly concave forward so that they deflect the gases laterally with a forward component.

An end plate is provided at the leading edge of each door and extends inward or forward in a plane substantially perpendicular to the longitudinal axis of the door to form an abutment for deflecting the gas stream forwardly. It has been found that a small abutment of this type having a height of only a few inches has an extremely high diverting effect which apparently results from the fact that the abrupt change of direction of the gas striking the abutment builds up a gaseous shield which is effectively an extension of the height of the end plate. In any event, tests shown that the reverse thrust obtained with this construction can exceed 60 percent of the maximum forward thrust of the engine through pressure ratios ranging from 1.3 to 4.0. Since no reverse thrust can be produced by any portion of a door extending beyond an abutment on the door, this tip mounted arrangement permits the use of a door of minimum length. Preferably the end plate is retractable into the thickness of the door in stowed position in order not to project inwardly into the path of the gas stream in normal operation.

Because the doors are mounted in openings in the shroud, the support structures serve as shields between the doors to prevent the escape of large quantities of gas laterally without any forward component, which is a very serious defect of the external target type mentioned above. Also the doors are mounted to solid structure rather than on elongate linkages which are vulnerable to the high vibration forces induced by the gas stream.

When the engine is of the type which includes an ejector barrel surrounding the nozzle, the shroud is preferably formed as an integral part of the ejector barrel. When the reverser is in use, the deflecting action of the doors and the end plates produces a slight back pressure. The support structures prevent the gas from flowing radially outward in the areas they cover. The result of these factors is a force tending to produce a back flow of exhaust gas into the ejector barrel in the areas adjacent to the support structures. This would hamper engine cooling flow and possibly the gases could reach a point of entry into the engine compartment. This undesirable effect is prevented by the provision of a "fence" mounted on the inner surface of each support structure which extends across at least the major part of the width of the structure. The fences intercept the back flow and force the gas to exit laterally with the main body of the stream. They are mounted in the ejector barrel downstream a sufficient distance to provide an adequate path for the normal flow of air, and may be fixed or retractable.

One of the principal advantages of the construction of this invention is that reversal can be used instead of throttling in military maneuvers, particularly steep dives. Ordinarily in such circumstances the procedure includes cutting the engine to flight idle while reduced speed is attained by speed brakes or the like. It is then essential to return to full power as quickly as possible. Tests have shown that various engines require from 4 to 14 seconds to regain full power. With the present reverser, the engine may be run at full throttle while producing full reverse thrust, which is more effective than idling. When the reverser is stowed the engine forward thrust full power is available in less than one second.

The shroud portion of the ejector barrel, including the doors, may take any suitable shape depending on the particular requirements of the engine with which it is used. However, it is normally generally cylindrical and the doors have arcuate cross sections which are concave inward, so that the doors present a troughlike shape for guiding the deflected or diverted gas stream.

BRIEF DESCRIPTION OF THE DRAWINGS

Various other advantages and features of novelty will become apparent as the description proceeds in conjunction with the accompanying drawings, in which.

DESCRIPTION OF PREFERRED EMBODIMENTS

Figures 1, 2, 7:
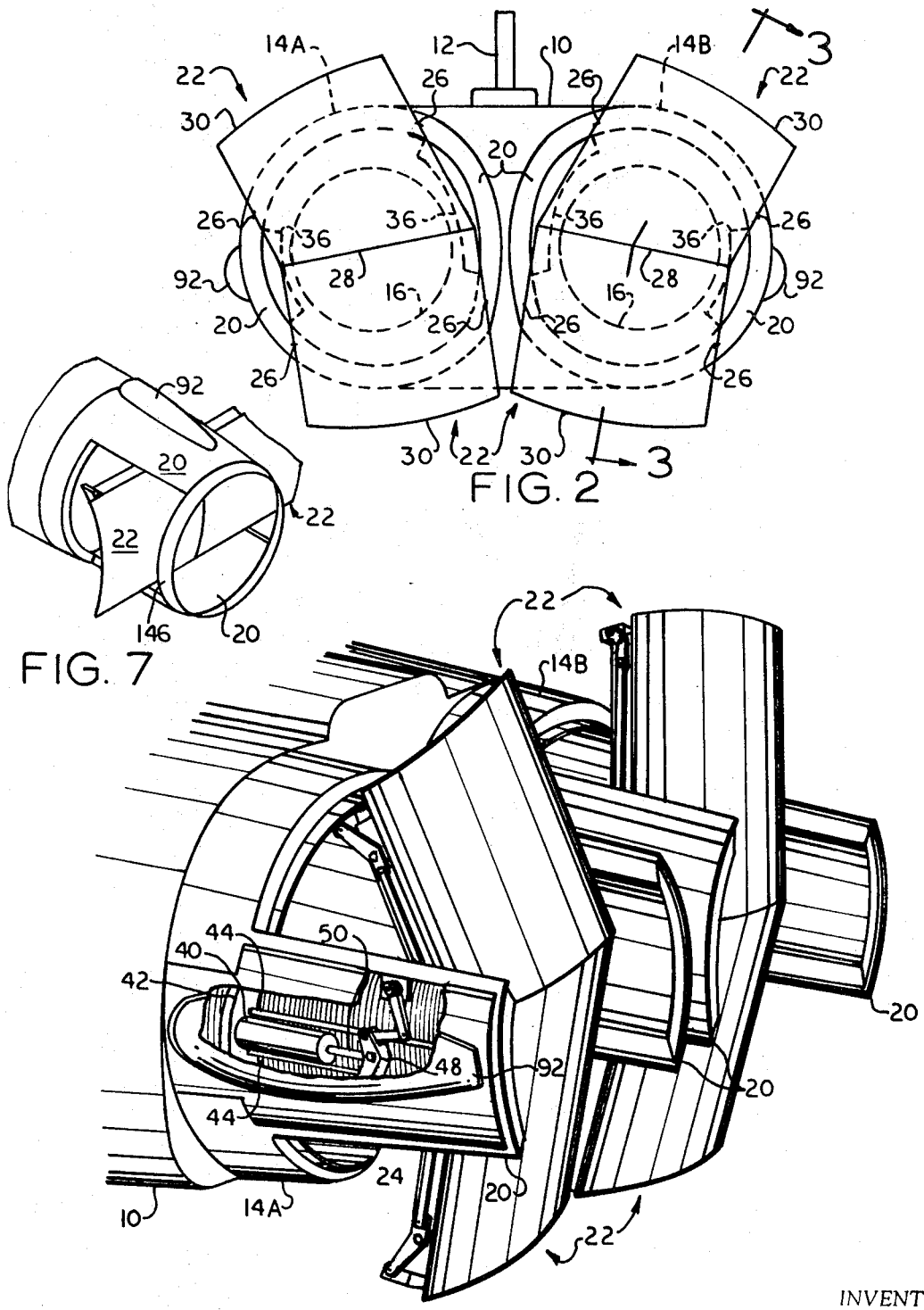
FIG. 1 is a pictorial view of the tail portion of an aircraft provided with thrust reversing apparatus in accordance with the present invention, panels being cut away in the drawing so that part of an actuating mechanism can be shown and thrust reversing doors being illustrated in a deployed position thereof.
FIG. 2 is a rear elevation of the tail portion of the same aircraft.
FIG. 7 illustrates a second embodiment of the invention.

The thrust reversing apparatus of this invention may be used with engines which are mounted in nacelles attached to wings or to fuselage sides, or with engines which are buried in the wings or fuselage or elsewhere, and operates in the same way in any installation. It is shown in FIG. 1 in conjunction with fuselage 10 which encloses two engines (not shown) and which has a vertical stabilizer 12 mounted thereon. The rearmost portion of the fuselage is formed with a pair of ejector barrels 14A, 14B which respectively surround the nozzle 16 (see FIGS. 2 and 3) of the aforesaid engines to form a path of annular cross section 17 for the flow of air for cooling and thrust augmenting purposes, this air flow being represented by arrows 18 in FIG. 3.

As illustrated in FIGS. 1 and 2, each ejector barrel terminates at its aft end in a shroud which comprises at least one and usually two or more fixed portions 20, and at least two movable portions which are generally designated 22 and which cooperate in their stowed positions to define the shroud as an elongate conduit which is substantially axially aligned with the axis of the nozzle. The fixed portions are firmly attached to the ejector barrel by bolts or the like and may include a structural mounting ring to unitize them and facilitate attachment to the ejector barrel.

Portions 20, which may be termed support structures, are spaced evenly around the periphery of the shroud, which is usually substantially cylindrical in cross section or slightly conical although it may take any form which fits the engine requirements. In the form shown, they are arranged in opposed spaced relation on opposite sides of a diametral reference plane which includes the axis of the nozzle. The support structures 20 define between them openings 24 for the exit of exhaust gas 25 and air 18 during thrust reversal, and portions 22, which may be termed blocker doors, are shaped and dimensioned to form accurate closures for openings 24 during normal operation.

Figure 3:
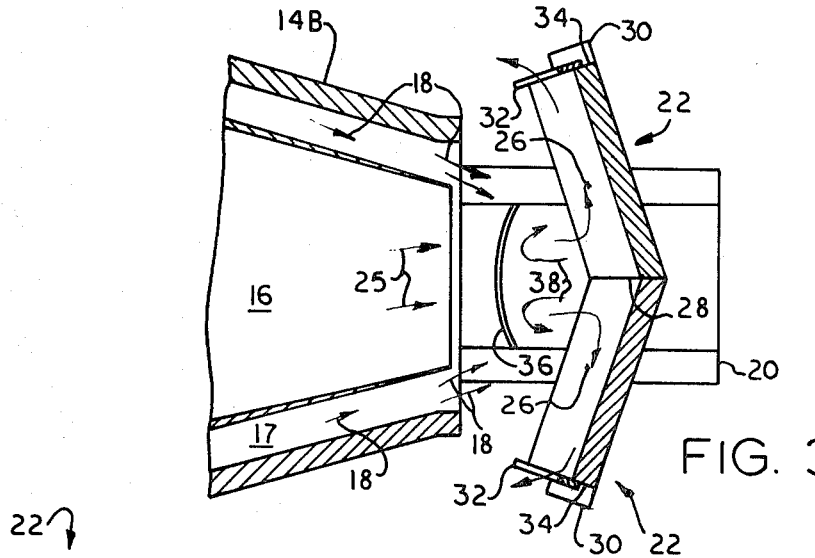
FIG. 3 is a longitudinal section of one of the two thrust reversing installations of the aforesaid aircraft, taken along the planes represented by line 3–3 in FIG. 2 and in the direction indicated therein.

The doors are pivotally mounted to the support structures, as indicated at 26 in FIGS. 2 and 3, at points intermediate the ends of the side margins of the doors and the support structures, their pivotal axes lying in a plane which is perpendicular to the longitudinal axes of the ejector barrels 14 so that when they are deployed the trailing ends 28 meet at the nozzle axis within the shroud contour. The diametrically opposed pairs of support structures are centered on planes which are disposed at an angle to the horizontal reference plane and the blocker doors are formed so that in their deployed position the upper doors are tilted outwardly (i.e., away from the plane which is centered between the sides of stabilizer 12) and the lower doors are tilted inwardly. The trailing ends of the blocker doors are formed so that they conformably abut one another when the doors are deployed. At the same time the leading ends 30 swing laterally outward of the shroud contour. Preferably the doors are so dimensioned and mounted that each door is inclined forwardly about 15° when deployed as illustrated in FIG. 3, and the doors thus form a V concave forward so that the diverted gas streams have a forward component and produce a certain amount of reverse thrust.

The major part of the thrust reversal in accomplished by the provision of end plates 32 mounted at the forward faces 34 of the doors (which faces are set back a short distance from the panels that form the outer surfaces of the doors). These end plates are thin and preferably flat and, when the doors are deployed, they project inwardly or forwardly from the inner surfaces of the doors in a plane which is substantially perpendicular to the longitudinal axis of the door. This abrupt abutment very forcefully diverts the gas stream forwardly to produce a very high reverse thrust component. It has been found that the diversion effect is considerably greater than would be expected from an abutment of only a few inches at most, and it is believed that this results from the fact that the diverted stream forms a gaseous wall which greatly increases the effective height of the end plate itself. An example of this effectiveness is a typical test run with an engine having an exhaust nozzle diameter of about 15 inches. The end plate height was varied from about 7 to 12 percent of the nozzle diameter or about 1 to 2 inches. With this very small abutment height the reverse thrust developed was from about 50 percent to over 60 percent of the full forward thrust of the engine.

The arrangement described above is far more effective than the external target type in which a pair of deflectors are abutted behind an open tailpipe. One reason for this is the fact that the support structures prevent radial outward flow into the area where the doors do not guide the stream. Consequently, all of the gas is given the necessary forward component which produces the desired reverse thrust. The present apparatus is also desirable because of its fail-safe characteristics. The pivot location is so chosen that the gas forces on the total door always exert a stowing moment. In the event of failure of the actuating mechanism, the doors will be urged toward stowed position and will at least trail sufficiently so that normal flight may be continued. Without this protective feature the pilot must promptly turn off the effected engine.

The construction and operation described above may be applied whether the engine is equipped with an ejector barrel or simply with a nacelle covering. In the case where an ejector barrel is present, as illustrated in FIG. 3, a problem arises because the combination of the back pressure produced by the doors and end plates and the obstruction to radial outward flow in the area of the support structures tends to produce a back flow of exhaust gas into the ejector barrel in the area upstream of the support structures. This back flow interferes with the cooling action and in some cases could reach a point of entry into the turbine which is very undesirable.

This problem is overcome by the use of barrier fence means or a "fence" 36 mounted to the inner wall of each support structure and extending generally perpendicularly to the axis of the nozzle. The fence extends across at least the major part of the width of the support structure 20 and has a height of the order of 10 percent of the nozzle diameter although it may vary from about 7 percent to more than 12 percent depending on design considerations. The fence is a thin plate generally arcuate in form and is mounted to be concave downstream and convex upstream. It is mounted at a point intermediate between the exhaust nozzle exit plane and the general plane of the deployed doors and preferably closer to the exhaust nozzle exit than to the doors. In any event it is sufficiently downstream to provide an adequate path for normal air flow through the ejector.

Figure 4:
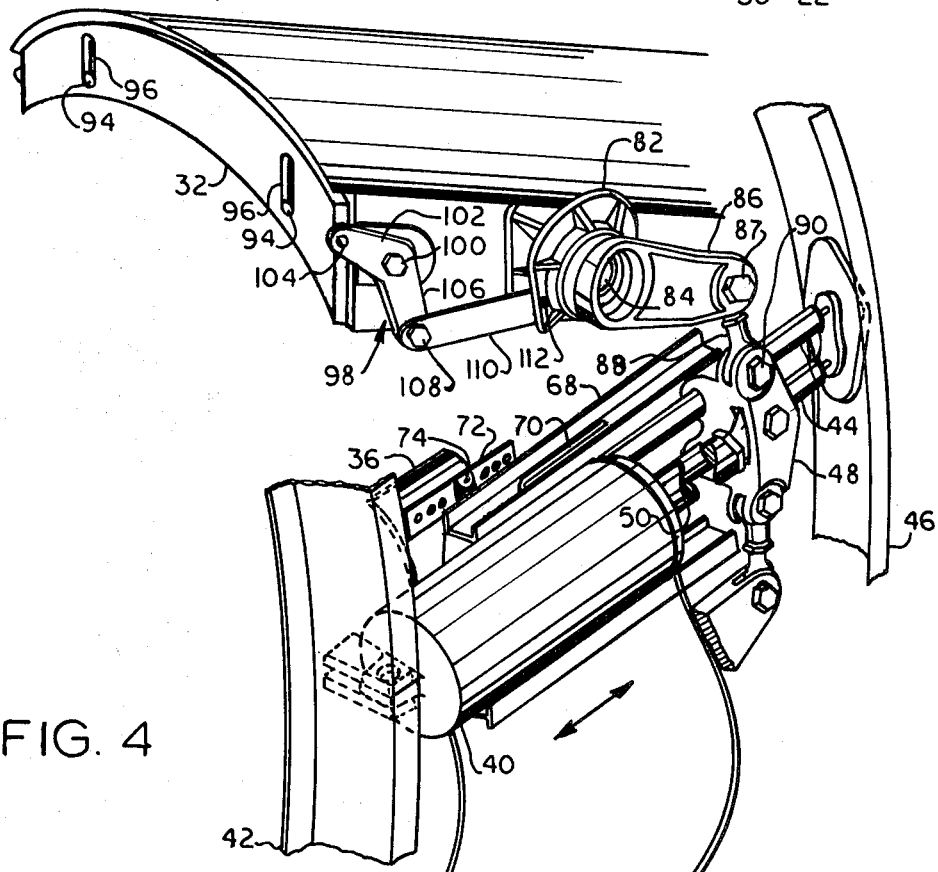
FIGS. 4–6 are enlarged, fragmentary pictorial views of components included in each thrust reversing installation of the aircraft.
Figure 6:
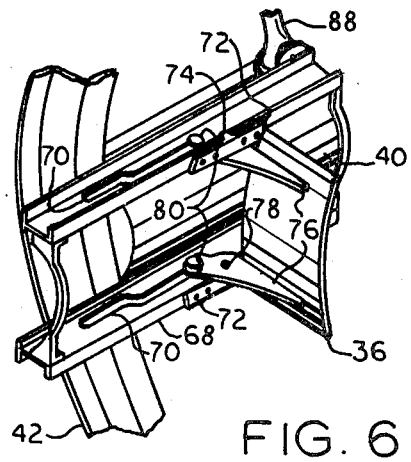
Figure 5:
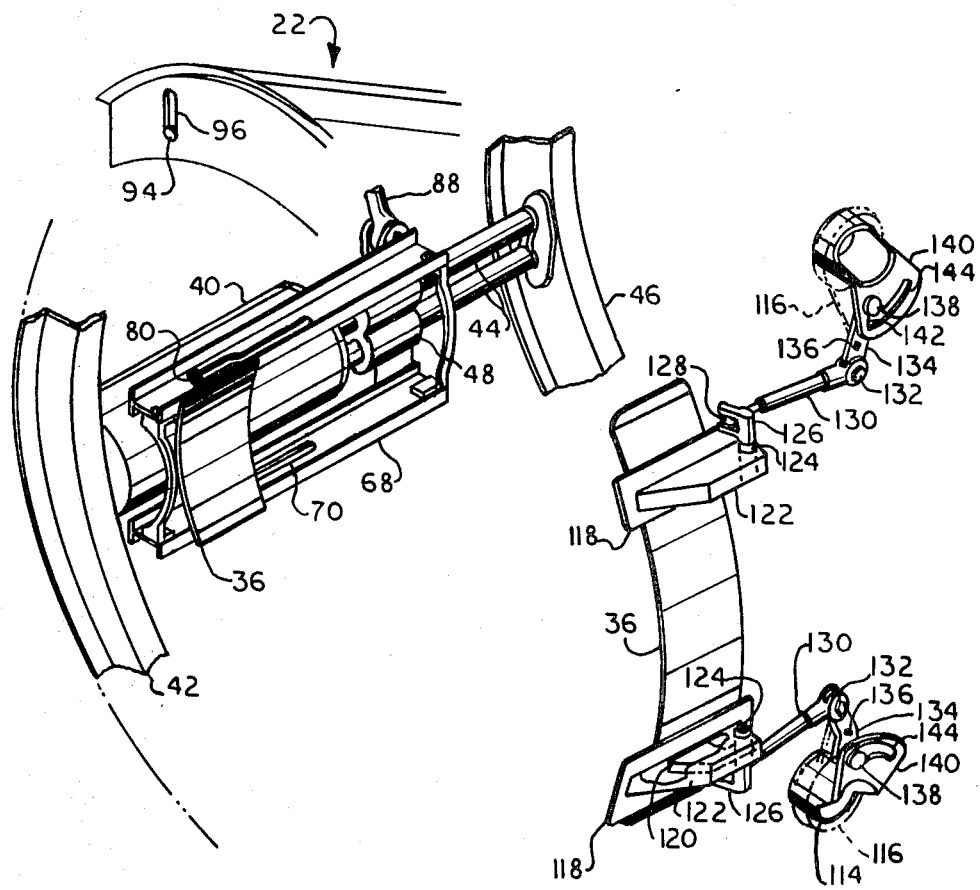

As will be observed in FIG. 3, the backflow, represented by arrows 38, occurs only in a narrow layer between the exhaust stream and the inner surface of each support structure 20. When it encounters fence 36 it is diverted laterally and exits with the main body of the exhaust stream. At the same time the air 18 flows around the ends and inner edges of the fences and is discharged with the exhaust gas. It can be seen in FIG. 2 that the width of the fence is usually somewhat less than the radial dimension of the air passage 17. In some embodiments fences 36 can be fixed in the position that is illustrated in FIGS. 2 and 3. However, both the end plates and the fences are preferably retractable and suitable mechanism for operating them is shown in FIGS. 4—6. Since the door 22 is of the same thickness as the walls of the support structures 20 and the ejector barrel 14 it is necessary to retract the end plate into the thickness of the door when the latter is stowed so that the end plate will not interfere with air flow from the ejector barrel in normal operation. Similarly, the fence can be retracted to lie substantially flush with the inner surface of the support structure.

Illustrated in FIGS. 1 and 4 is the actuating mechanism for the blocker doors which are pivoted to the support structures 20 attached to ejector barrel 14A. An identical mechanism actuates the blocker doors which are pivoted to the support structures of the other ejector barrel 14B. MOre particularly, a servocylinder 40 is attached to an arcuate rib 42 which forms a part of the outer support structure associated with each pair of blocker doors, and a pair of guide rods 44 are attached at one end to the same rib and at the other end to an arcuate rib 46 which also forms a part of the support structure. A bogie or toggle carriage 48 is mounted for sliding movement on guide rods 44 and is connected to piston rod 50 having a piston, not shown, within the cylinder. A reservoir 52 and pump 54 are connected by conduits 56 and 58 to a manually controlled valve 60 having a typical operating lever 62. The valve is connected by conduit 64 to the head end of the cylinder 40 and by conduit 66 to the rod end of the cylinder. The pilot may, by suitable actuation of lever 62, send pressurized fluid to either end of the cylinder to move the piston rod longitudinally and to hydraulically lock it in any desired position of adjustment. A track 68 is fixedly connected to each toggle carriage 48 and projects forwardly therefrom. As can be seen in FIGS. 5 and 6, which illustrate the actuating mechanism for the doors pivoted to the support structures 20 on ejector barrel 14B, each track 68 is formed with a pair of slots 70 each of which has offset axially extending portions as illustrated. Two support plates 72 are fixedly attached to the inside surface of each outer support structure 20, each of these plates having a lug 74 formed thereon. The fence 36 associated with each outer support structure has two lever arms 76 fixedly secured to one side thereof, and these lever arms are respectively pivoted to lugs 74 by means of pins 78. Attached to the free end of each lever arm 76 is a cam follower 80 one end of which is slidably disposed within a respective one of the slots 70.

A typical one of the doors 22 is shown in solid lines in FIG. 4 in its stowed position with the end plate 32 retracted into flush position. Bracket 82, fixed to the outer support structure 20, serves as a pivot bearing for the axle 84 which is fixedly secured to the side edge of the door. The opposite margin of each door 22 is pivoted to an inner support structure by pivot means which will be described hereinafter. Lever arm 86 is fixed to axle 84 and its free end is pivotally connected at 87 to link 88 which in turn is pivotally connected at its opposite end to carriage or bogie 48 or 90. In FIG. 4 the carriage is illustrated at its extreme rear position and link 88 is slightly over center to positively lock the door in stowed position. As piston rod 50 is retracted the carriage moves forwardly and link 88 pulls the free end of lever 86 downward, swinging the door toward deployed position. By suitable operation of lever 62 the pilot may move the door to any degree of deployment and lock it in that position. Since the door actuating mechanisms are larger than the thickness of the support structure, suitable streamlined covers 92 are provided as illustrated in FIG. 1.

At the forward face 34 of each door 22 the end plate 32 is mounted by guide pins 94 on the door and guide slots 96 in the end plate for sliding movement in a plane perpendicular to the longitudinal axis of the door to project inwardly and forwardly when the door is deployed and to be flush with its inner surface when the door is stowed. It is thin and flat and shaped to conform with the arcuate contour of the door. To control the movement a bell crank, generally designated by the number 98, is provided at each margin of the door, mounted on a pivot 100. Arm 102 of the bell crank is pivotally connected to the end plate at 104 with a slight amount of lost motion. Arm 106 is pivotally connected at 108 to a link 110 which in turn is pivotally connected at 112 to the fixed bracket 82. As the door moves toward deployed position the restraining action of link 110 causes the bell crank 98 to rotate counterclockwise as viewed in FIG. 4, which causes end plate 32 to extend inward of the inner surface of the door. The movement is generally proportional to the angular movement of the door.

When each carriage 48 is in the rear position thereof, the cam followers 80 associated with the outermost fences 36 are disposed at the forward ends of the slots 70 in tracks 68 (see FIG. 5). When the carriages 48 are moved in the forward direction to deploy doors 22 to the position illustrated in FIG. 1, the tracks connected to said carriages are moved to the position illustrated in FIG. 6 (which drawing depicts the servocylinder 40 and track associated with the support structure 20 located on the right in FIG. 1) and the cam followers 80 slide to the aft ends of slots 70. The offset arrangement of the forward and aft portions of the slots 70 causes lever arms 76 to swing about the pivot lugs 74 on support plates 72, thereby moving the outermost fences to the deployed position which is illustrated in FIGS. 2, 3 and 6.

The support structures 20 which are situated between the two pairs of blocker doors 22 can each be provided with an actuating mechanism which includes a servocylinder 40, carriage 48, and the other associated components that have been described above. However, in the embodiment of the invention which is being described only one servocylinder 40 is used to actuate each pair of doors 22, and the mechanism illustrated in FIG. 5 is used to mount the inner sides of said doors to the inner support structures and to actuate the fences 36 which are mounted on said inner support structures. More explicitly, an axle 114 is fixedly attached to the inner side of each door 22 and is journaled in a bracket 116 which in turn is mounted on a respective one of the inner support structure 20. Secured to the inner surface of each inner support structure 20 are two hinge brackets 118. The fence 36 associated with each inner support structure has a support lug 120 fastened at each end thereof (only one of which lugs is illustrated, in the cut out section of the lower hinge bracket 118 in FIG. 5) and the free end of this lug is pivoted to a laterally projecting portion 122 of a respective one of the hinge brackets by means of a hinge pin 124. Arms 126 are fixed to the hinge pins and their free ends are pivotally connected at 128 to links 130, the opposite end of each link being pivotally connected at 132 to a bell crank 134. The bell crank is pivotally mounted at 136 to a respective one of the inner support structures 20 and at its outer end carries a roller 138. The door mounting axle 114 has a cam plate 140 fixedly connected thereto and the cam plate is provided with a cam slot having a first section 142 extending generally radially and blending into a second section 144 which is arcuate and centered on the axis of axle 114.

With the door stowed and the fence retracted, the parts are as shown in FIG. 5. As the door begins to deploy, cam plate 140 begins to rotate clockwise (considering the upper cam plate as viewed in this FIG.). In the first part of its movement it forces the roller 138 to the left, pulling link 116 to the right and moving fence 36 toward extended position. As this movement continues, the roller 124 moves along cam section 142 until it reaches section 144. At this time the door has rotated about 34° and the fence is substantially perpendicular to the axis of the nozzle. As the door continues to move, cam section 144 maintains a constant distance between the axis of axle 114 and the roller, and therefore the fence is locked in its extended position. On stowing movement of the door, the reverse action takes place and the fence retracts during the last 34° of movement of the door. Thus the fence is in active position by the time the door is deployed to any usual reversing attitude.

It will be apparent that the present invention provides a thrust reversing apparatus which is extremely versatile and effective and which is mechanically very simple requiring a minimum of inspection, maintenance, and repair. It will also be apparent that the invention is not limited to the described and illustrated arrangement which comprises two identical thrust reversing assemblies associated with a pair of engines disposed side-by-side within the fuselage of a military aircraft. Different mechanisms can also be used to actuate the doors 22 and fences 36. In some embodiments of the invention the doors 22 can be mounted in a shroud so that they pivot about vertical axis and a ring 146 can be attached to the aft end of the support structures 20 of said shroud to form a very rigid structure, this arrangement being illustrated in FIG. 7.

We claim:

1. Thrust reversing apparatus for use in combination with a jet engine having a rearwardly discharging nozzle adapted to produce reaction thrust, comprising: a shroud carried by said engine and located rearwardly of the exit end of said nozzle to surround and control the exhaust gas stream issuing from said nozzle; said shroud including at least one fixed portion and at least two movable portions adapted in their stowed position to cooperate with the fixed portion to define said shroud as an elongate conduit substantially axially aligned with the axis of the nozzle; said movable portions constituting blocker doors having leading and trailing edges and movable to a deployed position in which said trailing edges are in juxtaposition within the contour of said shroud and said leading edges extend laterally outward of the contour of said shroud; said doors combining in their deployed position to block rearward flow of the exhaust gas stream and divert it laterally; and a flow diverting end plate mounted at the leading edge of each door and lying in a plane substantially perpendicular to the longitudinal axis of its associated door and movable in said plane between a first retracted position in the stowed position of the door and a second extended position in the deployed position of the door; each end plate being substantially flush with the inner surface of its door in the first position and extending forwardly of the inner surface of the door in the second position to sharply divert the gas stream forwardly and produce a reverse thrust reaction.

2. Apparatus as claimed in claim 1; said doors being so mounted that, in their fully deployed position with their trailing edges abutting each other, the leading edges of the doors are located forwardly of the trailing edges to provide a forward concave V-formation to direct the gas stream laterally and also substantially forward prior to contact with said end plates.

3. Apparatus as claimed in claim 1; said doors being pivotally mounted to the fixed portion of the shroud at points intermediate their ends; and controllable actuating means carried by the fixed portion to swing said doors between stowed and deployed positions; the areas of the door portions rearward of their pivotal mounting being subject to the direct reaction force of the gas stream and being large enough to urge the doors toward their stowed positions in fail-safe manner in the event of failure of the actuating means.

4. Apparatus as claimed in claim 1; said doors being pivotally mounted to the fixed portion of the shroud at points intermediate their ends; and controllable actuating means carried by the fixed portion to swing said doors between stowed and deployed positions; said actuating means being adapted to move said doors to any intermediate position and hold them in such position to produce any desired degree of reverse thrust to facilitate tactical maneuvers during flight.

5. Apparatus as claimed in claim 1; said end plates being extendible from their retracted position to a height above the inner surface of their respective doors equal to about 8½ percent of the diameter of the nozzle exit.

6. Apparatus as claimed in claim 1; said end plates being extendible from their retracted position to a height above the inner surface of their respective doors equal to about 7 to 12 percent of the diameter of the nozzle exit.

7. Apparatus as claimed in claim 1; each door being generally arcuate in cross section in planes transverse of its longitudinal axis and being inwardly concave; and its end plate being slidably mounted directly at the leading edge and having an outline conforming to the cross section of the door to lie within its boundaries when in retracted position.

8. Apparatus as claimed in claim 1; said end plates being movable from their first to their second positions substantially proportionally with the deploying movement of the doors; the plane of each end plate being substantially perpendicular to the longitudinal axis of its door at every stage of its extension to produce the maximum diversion of the gas stream for any given exposed area of end plate.

9. Apparatus as claimed in claim 1; the fixed portion of the shroud including two longitudinal support structures arranged in spaced opposed relation on opposite sides of a diametral reference plane containing the longitudinal axis of the shroud; each support structure having opposed longitudinally extending margins; each door having longitudinal margins mating with the margins of the support structures when in stowed position to complete the contour of the shroud; pivot means connecting an intermediate point of the margin of each door to an intermediate point of the margin of each support structure for rotation of said doors about substantially parallel axes perpendicular to said reference plane; manually controllable actuating means carried by each support structure; and linkage means connecting each actuator to the adjacent margin of each door to controllably swing said doors to any selected position between stowed and fully deployed and maintain them in such selected position.

10. Apparatus as claimed in claim 9; and linkage means carried within the contour of each door and connected at one end to a fixed point on the support structure and at the other end to the end plate to cause and control its extension and retraction substantially in proportion to the angular movement of the door.

11. Thrust reversing apparatus for use in combination with a jet engine having a rearwardly discharging nozzle adapted to produce reaction thrust, comprising: an ejector barrel adjacent said nozzle and radially spaced therefrom to provide a path of annular cross section for the flow of air to provide cooling and add mass to the exhaust gas stream issuing from the nozzle; a shroud carried by said engine and located rearwardly of the exit end of said nozzle in continuation of the ejector barrel and serving as an ejector extension to surround and control the exhaust gas stream; said shroud including at least one fixed portion and at least two movable portions mounted on the fixed portion and adapted in their stowed position to define with said shroud an elongate conduit substantially axially aligned with the axis of the nozzle and ejector barrel; said movable portions constituting blocker doors having leading and trailing edges and movable to a deployed position in which said trailing edges are in juxtaposition at the axis of the nozzle and said leading edges extend laterally outward of the contour of said shroud; said doors combining in their deployed position to block rearward flow of the exhaust gas stream and divert it laterally and radially outwardly; and a flow diverting end plate mounted at the leading edge of each door and extending inwardly from the inner surface of the door in a plane perpendicular to the longitudinal axis of the door to sharply divert the gas stream forwardly when the door is deployed and produce a reverse thrust reaction; the combination of back pressure built up by the diverting action of the doors and end plates and obstruction to radial outflow in the area of the fixed portion tending to produce back flow of exhaust gas into the ejector barrel upstream of the fixed portion; and means to prevent such back flow comprising barrier fence means extending across the fixed portion and inwardly toward the nozzle axis to intercept such back flow and redirect it radially outward with the main body of the exhaust gas stream.

12. Apparatus as claimed in claim 11; the fixed portion of the shroud including at least two longitudinal support structures secured at their forward ends to the ejector barrel and spaced around the periphery of the shroud to define an equal number of lateral passages; said doors being pivotally mounted to said structures to swing between stowed positions in which they close said passages and deployed positions in which they divert the gas stream out through said passages; said barrier fence means comprising an individual fence mounted on each support structure and extending across at least the major part of the width of the support structure.

13. Apparatus as claimed in claim 12; each fence being concave downstream to more effectively intercept the back flow and convex upstream to facilitate normal air flow in the region of each support structure.

14. Apparatus as claimed in claim 12; said fences being spaced downstream of the exhaust nozzle exit plane to provide an adequate path for the flow of air therethrough.

15. Apparatus as claimed in claim 12; said fences being located longitudinally intermediate the exhaust nozzle exit plane and the deployed position of the doors, and closer to the ejector barrel.

16. Apparatus as claimed in claim 12; said fences having a height of the order of 10 percent of the diameter of the nozzle.

17. Apparatus as claimed in claim 12; said fences having a height of about 7 percent to about 12 percent of the diameter of the nozzle.

18. Apparatus as claimed in claim 12; said fences being retractable into a position substantially flush with the inner surface of the respective support structure.

19. Apparatus as claimed in claim 12; and means to move said fences into fully extended position during about the first third of the deploying movement of the doors.

20. Apparatus as claimed in claim 12; actuating means carried by each support structure and adapted to be operated from a remote point; linkage means connected between each actuating means and the adjacent side margin of a pair of doors to move them between stowed and deployed positions; and further linkage means connected between each actuating means and a fence to move the latter between retracted and extended position in synchronization with the movement of said doors between said stowed and deployed positions thereof.